P. BUDENBACH.

Lamp for Locomotive Head Lights.

No. 3,508. Reissued June 15, 1869.

INVENTOR

Jas. Bradley

Alexander McAlister

Robert S. Ackman

WITNESSES

Thomas Driffill

Chas J. Leander

N. PETERS, Photo-Lithographer, Washington, D. C.

UNITED STATES PATENT OFFICE.

JAMES RADLEY, ALEXANDER McALISTER, AND ROBERT S. AIKMAN, OF NEW YORK, N. Y., ASSIGNEES, BY MESNE ASSIGNMENTS, OF PETER BUDENBACH.

IMPROVEMENT IN LAMPS FOR LOCOMOTIVE HEAD-LIGHTS.

Specification forming part of Letters Patent No. 38,001, dated March 24, 1863; Reissue No. 3,508, dated June 15, 1869.

*To all whom it may concern:*

Be it known that PETER BUDENBACH, of the city, county, and State of New York, has invented a new and useful Improvement in the Construction of Coal-Oil Lamps designed to be used for Locomotive Head-Lights; and we do hereby declare that the following is a full and exact description thereof, reference being had to the accompanying drawings, making part of this specification—

Figure 1:
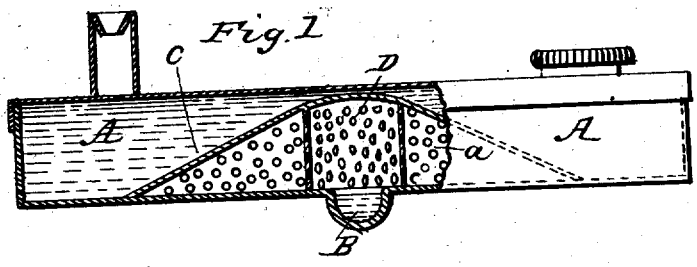
Figure 2:
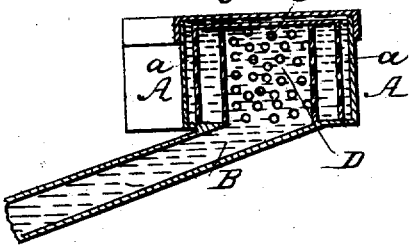
Figure 3:
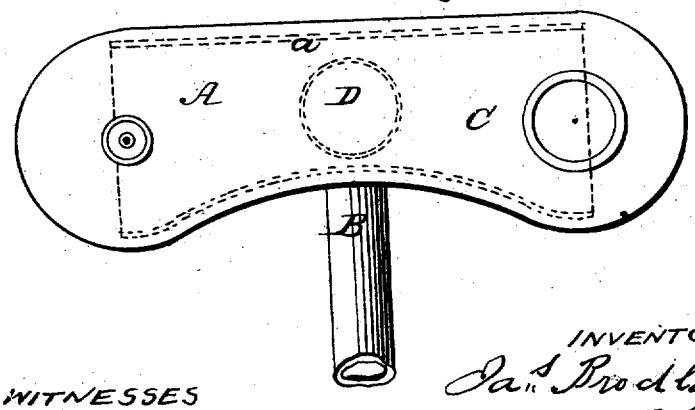

Figure 1 being front elevation, partly in section, of said invention; Fig. 2, a vertical cross-section of the same; Fig. 3, a top view or plan.

The object of this invention is to obtain a lamp for burning coal-oil, which may be used as a head-light for locomotives.

The invention consists of an improved apparatus or device pertaining to the oil fountain or reservoir, as hereinafter set forth.

To enable others skilled in the art to fully understand and construct this invention, we will proceed to describe it.

A A represent the oil chamber or reservoir, which may be described as being a flat metallic box and occupying a horizontal position. This oil-chamber is made to communicate with the lamp by means of an inclined tube, B, passing downward from its lower part. Within this oil-chamber there is placed what may be termed a "bridge," which is constructed of a curved top plate, C, both ends of which are in contact with the bottom of the oil-chamber A A. This bridge is not quite equal in width to the oil-chamber A A, and its back and front sides are formed of perforated plates *a a*, Figs. 1 and 2.

Within the bridge, and to the under side of its top plate, C, there is attached a perforated cylinder, D, which extends down to the bottom of the oil-chamber, and so as to cover or surround the orifice of the tube B.

It will be seen that the oil which enters the lamp must necessarily pass through the perforated plates *a a* of the bridge, and also through the perforated cylinder D, before entering the tube B. By this construction the oil is supplied uniformly to the lamp as it is consumed, notwithstanding the unsteady motion of the locomotive, which result is due to the number and arrangement of the perforated plates through which the oil has to pass. The top plate, C, of the bridge also serves to prevent the commotion or agitation of the oil above it being transmitted to the oil below it.

Coal-oil, in order to be burned in locomotive head-lights, must be prevented from suddenly mounting or jumping in the wick-chamber, and thereby coming too near the flame—a contingency which has heretofore frequently happened by the shaking and unsteady movement of the locomotive; but the invention herein described fully obviates this difficulty.

Having thus described the invention of the said PETER BUDENBACH, what we claim therein as new, and desire to secure by Letters Patent of the United States, is—

The bridge in the oil-chamber A A, formed of the curved plate C and perforated sides *a a*, and provided with a perforated cylinder, D, inclosing the tube B, which leads to the lamp, substantially as and for the purpose specified.

JAS. RADLEY.
ALEXANDER McALISTER.
ROBERT S. AIKMAN.

Witnesses:
THOMAS DRIFFILL,
EDWARD LYON, JR.